UNITED STATES PATENT OFFICE.

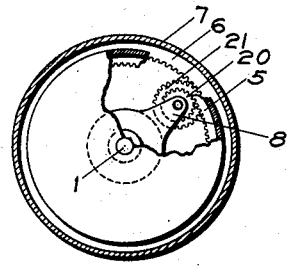
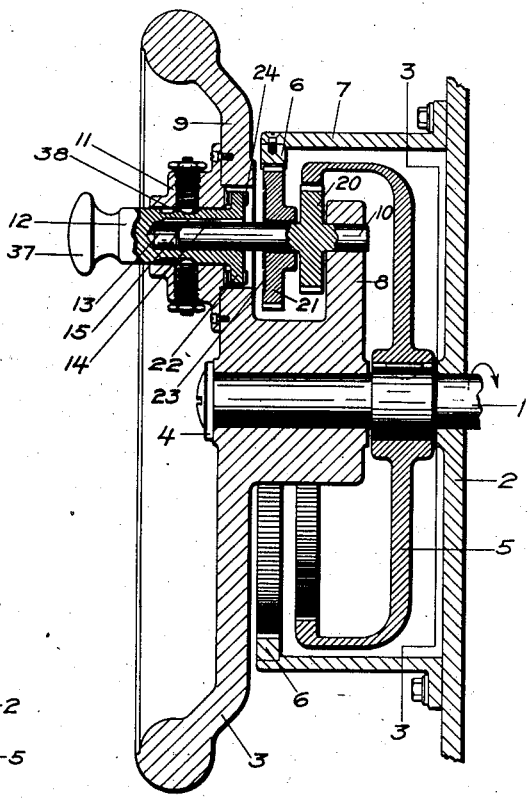
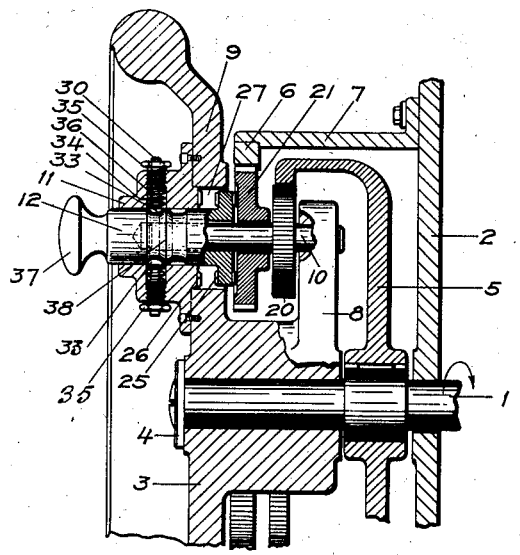
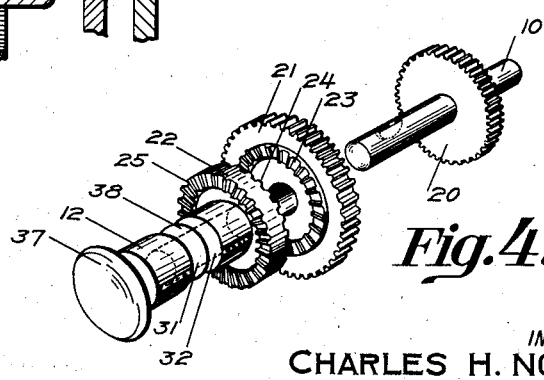

CHARLES H. NORTON AND ALBERT TURNER, OF WORCESTER, MASSACHUSETTS, ASSIGNORS TO NORTON COMPANY, OF WORCESTER, MASSACHUSETTS, A CORPORATION OF MASSACHUSETTS.

CLUTCH MECHANISM.

1,389,267.  Specification of Letters Patent.  Patented Aug. 30, 1921.

Original application filed September 27, 1917, Serial No. 193,600. Divided and this application filed February 9, 1918. Serial No. 216,167.

*To all whom it may concern:*

Be it known that we, CHARLES H. NORTON and ALBERT TURNER, citizens of the United States of America, residing at Worcester, in the county of Worcester and State of Massachusetts, have invented certain new and useful Improvements in Clutch Mechanisms, of which the following is a full, clear, and exact specification.

Our invention relates to clutch mechanism and more particularly to devices for obtaining synchronous or relative rotative movement of two rotative parts.

It is an object of our invention to provide a simply constructed, easily manipulated, positively acting clutch device which may be utilized to throw a movable part into operation, or to stop and hold stationary a previously rotating part with an absolute finality of movement, and to so design a clutch mechanism that upon manually starting the movement of the clutch member, it will then act positively and automatically to connect the rotative parts together, or to perform the desired function.

A further object is to provide a clutch device which may be manually operated merely by striking or pulling on a handle which forms a part of and projects exteriorly and axially from the movable clutch member, whereby a direct positive control of the clutch may be had without the use of intervening levers or other unnecessary accessories for moving the clutch.

With these and other objects in view, as will appear from the following disclosure, our invention resides in the combination of parts set forth in the specification and covered by the claims appended hereto.

Reference being had to the accompanying drawings, in which like numerals indicate like parts:

Figure 1 is a central, vertical section of one type of device embodying our invention, showing the clutch in position for a direct drive;

Fig. 2 is a similar view, showing the part positioned for a slow motion;

Fig. 3 is a section on line 3—3 of Fig. 1, looking from the rear, parts being broken away to show the pinion and internal gear teeth; and Fig. 4 is a detail in perspective of pinion, shaft and clutch quill in unassembled but relative positions.

In the drawings we have illustrated one embodiment of our invention as applied to a multiple speed mechanism adapted for moving the work table of a grinding machine, in order that the practicability and utility of our clutch device may be readily understood. Referring to the figures, we have shown a driven shaft 1 suitably mounted to rotate in support 2 and actuated through intermediate gearing by a driving member, such as the manually operated hand wheel 3 which is rotatably mounted on a reduced portion of the shaft 1 and held in place by any suitable means, such as a collar or washer 4 fixed to the shaft.

The gearing may comprise an internally geared wheel 5 concentric with and keyed to the shaft 1 to rotate therewith and a fixed annular internal gear rim 6 mounted on a cylindrical holder 7 bolted to the support 2, the center line of the fixed gear rim 6 being alined with the axis of the geared wheel 5.

Two projecting arms 8 and 9 on the hand wheel 3 serve as bearing supports for a small pinion shaft 10, one end of which is rotatably and non-slidably mounted in arm 8. The arm 9 may constitute one of the radial spokes of the hand wheel, and in this form has a bearing block 11 fastened thereto, the block being centrally apertured, to carry a rotatable, longitudinally slidable quill or clutch collar 12 mounted therein. The forward end of shaft 10 is held in a centrally disposed bearing socket 13 within the quill clutch member, the socket 13 being sufficiently deep to permit longitudinal movement of the quill on the shaft. Relative rotation of quill and shaft is prevented by keying the parts together, as by means of a feather 14 fixed in the shaft and coöperating with a long groove 15 on the internal wall of the quill.

A pinion 20 rigidly connected to shaft 10, and here shown as integral therewith, and a pinion 21 rotatably mounted on shaft 10 continuously mesh with the movable and the fixed internal gears 5 and 6 respectively, to revolve about shaft 1 and the axes of the internal gears, these parts being suitably constructed to perform the functions desired. The adjacent faces of pinion 21 and an annular flange 22 on quill 12 are provided with preferably fine clutch teeth 23 and 24, which are adapted to engage each other readily and securely to connect the pinions and cause them to rotate in synchronism, it being noted that the quill or clutch member 12 and pinion 20 are non-rotatably fixed on shaft 10. On the front side of the flange 22 is another set of teeth 25 adapted to coöperate with teeth 26 on the inner face of the bearing block 11 surrounding the slidable quill and connect the quill and the pinion 20 rigidly and non-rotatively with the hand wheel. As illustrated, clearance for flange 22 is provided by making a large aperture 27 in the arm 9, the longitudinal movement of the quill being determined by engagement of the clutch teeth.

In order that the slidable clutch member may be easily manipulated and automatically held in either of its operative positions, we may utilize a special feature of our invention, comprising spring pressed plungers 30 slidably mounted in the bearing block 11 and engaging one or the other of two parallel, annular, external grooves 31 and 32 on the quill. There are provided preferably two plungers mounted to engage the groove on diametrically opposite sides of the quill 12, this arrangement minimizing friction and strains between shaft 10 and its bearings. Each plunger may have a head 33 on its inner end, which is forced inwardly by means of an expansion spring 34 engaging the inner surface of an annular bolt 35 surrounding the plunger and threaded into the aperture 36 provided in the bearing 11 for this purpose. A handle 37 on the outer end of the quill serves for manual manipulation of the clutch, this handle projecting exteriorly and axially from the movable clutch member to the outside of the mechanism where it may be easily reached and moved by the operator without especial attention being given to such operation.

In order that there may be no neutral position for the clutch and to insure automatic engagement of the clutch teeth if the operator moves the quill only a part of the necessary distance, we provide an annular wedge-shaped ridge 38 between the grooves 31 and 32. The slope of the ridge is such that the plungers may ride up one surface, when the quill is moved, and then passing over the ridge, automatically travel completely to the bottom of the groove, the springs being of sufficient strength to perform this operation. Hence the operator, to change the speed of the mechanism while turning the hand wheel, has but to strike the quill handle with the palm of his hand or similarly give it a quick pull, and the clutch teeth automatically seat in their new positions, this operation being materially aided by the fact that the clutch teeth are fine and can engage quickly for any position of the parts. It is obvious that shaft 1 may be connected with the object to be moved by any suitable mechanism and that the speeds obtainable herewith may be modified by gearing or other means, as desired.

The various gears and pinions illustrated in the drawings may be of such proportions and have such numbers of teeth as to produce a slow forward movement of the driven shaft 1 when hand wheel 3 is revolved. The ratio of the teeth on the gear 5 to those on the pinion 20 is made unequal to the ratio of the teeth on gear 6 to those on pinion 21, so that there is at least one more tooth on wheel 5 than required to permit pinion 20 to make the same number of rotations as does pinion 21 during a revolution about the fixed gear 6. As a specific example, we may employ 72 teeth on internal gear 6, 68 on the rotatable internal gear 5, 24 teeth on the pinion 21, and 20 teeth on pinion 20, thereby obtaining a forward movement of 8 teeth on gear 5 for each revolution of hand wheel 3.

The operation of the entire mechanism is as follows: To obtain a fast motion of shaft 1 the parts are positioned as shown in Fig. 1, the quill 12 being drawn to its outward limit of motion, so that clutch teeth 25 and 26 on the quill and bearing block 11 are in engagement and quill, shaft 10 and pinion 20 are fixed relative to the hand wheel. Hence movement of wheel 3 causes pinion 20 to revolve about the axis of shaft 1 without rotating in its bearings and drag the internal gear wheel 5 and shaft 1 with it, the pinion 21 idly rotating about its axis and in engagement with the fixed gear 6. When it is desired to change to a slow differential motion, the operator merely has to strike quill 12, thereby forcing it inwardly and placing clutch teeth 23 and 24 in position for engagement, as shown in Fig. 2, and causing pinions 20 and 21 to rotate in synchronism. Movement of hand wheel 3 revolves these pinions about axis 1, but pinion 21 meshing with the fixed rack 6 is thereby forced to rotate, turning pinion 20 with it, which in turn has to move the larger wheel 5 ahead during the revolution, and cause differential movement of the parts.

In accordance with our invention we have provided a clutch and power transmitting mechanism embodying a wheel 21 rotatably mounted on a shaft and having fine, closely spaced clutch teeth on one face adapted to engage similar teeth on a clutch member 12, which is axially alined with the wheel and longitudinally movable relative thereto to throw the clutch teeth into or out of operative engagement and thereby rotate the clutch member with the wheel or permit it to remain stationary. In order that power may be transmitted by the device, assuming the wheel 21 to be rotated, as in the present embodiment by engagement with the fixed rack 6, a suitable mechanism, such as a gear wheel 20 is mounted to rotate synchronously with the clutch member 12. The member 12 is also provided with teeth 25 engageable with similar teeth 26 on a relatively immovable member 11, located exteriorly of the clutch mechanism, whereby upon disengagement of wheel 21 and clutch member 12 the latter and the wheel 20 may be kept from rotating, thereby permitting wheel 21 to rotate alone.

It is therefore clear that in this construction we have provided a clutch mechanism of general utility for rotating two bodies simultaneously or of permitting one to rotate while the other is held immovable by engagement of clutch teeth with a fixed support. The utility of such a device in various arts is readily apparent.

This application is a division of our copending application, Serial #193600, filed September 27, 1917, on multiple speed devices.

Having thus described our invention, what we claim as new and desire to secure by Letters Patent is:—

1. In a clutch mechanism, a support having a bearing aperture therein, a clutch collar rotatably and slidably mounted in said bearing aperture, a shaft rotatable with said collar, a member on said shaft adapted to be engaged by the clutch collar for rotation therewith and means on the support for engagement with the clutch collar to prevent rotation thereof.

2. In a clutch mechanism, a support having a bearing aperture therethrough, a clutch collar slidably mounted in said aperture and having a bearing socket therein, a shaft slidably keyed in said socket, rotatable means on the shaft engageable by the clutch collar for connection therewith and means on the support for engagement with the clutch collar to prevent rotation of the shaft.

3. In a clutch mechanism, a support, a clutch collar slidably and rotatably mounted thereon, said collar having one end projecting forwardly of the support for manual operation thereof, a socket in the other end, a driving shaft slidably keyed in said socket, a rotative member adapted to be operatively connected to the clutch collar in one position of the latter, and means on the support for engagement with the clutch collar when in another position to prevent rotation thereof.

4. In a clutch mechanism, a support having a bearing therein, a clutch member slidably and rotatably mounted in the bearing, said member having a head at one end projecting forwardly of the support and a socket in the other end, a shaft keyed in said socket for axial movement of the clutch member, and a wheel rotatably mounted on the shaft, said support, wheel and clutch member having coöperating clutch teeth thereon adapted to prevent rotation of the shaft when the teeth on the clutch member engage those on the support and to cause the shaft and wheel to rotate together when the teeth of the clutch member and wheel are in engagement.

5. In a clutch mechanism, two bearing members, a quill provided with a clutch face and rotatably mounted in one bearing, a shaft mounted in the quill and the other bearing, said quill and shaft being relatively non-rotatable but longitudinally movable relative to each other, a wheel rotatably mounted on said shaft and adapted to operatively engage said quill clutch face and be non-rotatably connected with said shaft upon relative movement of quill and wheel into contact.

6. In a clutch mechanism, two bearing members, a longitudinally slidable quill rotatably mounted in one bearing, a shaft rotatably mounted at one end in the second bearing member and at its other end non-rotatably mounted in and slidably keyed to said quill, whereby the latter may move on the shaft, a wheel rotatably mounted on the shaft, said quill and wheel constituting clutch members adapted to be placed in operative engagement, and means to cause engagement of and maintain said clutch members in positive connection upon slidably moving said quill toward said wheel.

7. In a clutch mechanism, two bearing members, a rotatable shaft mounted at one end in one bearing member, a wheel revolubly mounted on the shaft and having clutch teeth on one face, a clutch collar slidably and non-rotatively keyed to said shaft and having teeth adapted to engage the wheel clutch teeth, said collar being rotatively mounted in the second bearing member to support one end of said shaft and having two parallel, annular, external grooves separated by a wedge shaped ridge, and spring pressed plungers mounted in the collar bearing member to engage with one or the other of said grooves diametrically opposite each other and thereby hold the clutch teeth in or out of operative relationship.

Signed at Worcester, Massachusetts, this 2 day of Feb., 1918.

CHARLES H. NORTON.
ALBERT TURNER.